(12) United States Patent
Gove, Jr.

(10) Patent No.: US 11,568,106 B1
(45) Date of Patent: Jan. 31, 2023

(54) DYNAMIC UPDATING OF A FORCE APPROXIMATION DATA MODEL

(71) Applicant: Two Six Labs, LLC, Arlington, VA (US)

(72) Inventor: Robert Paul Gove, Jr., Reston, VA (US)

(73) Assignee: Two Six Labs, LLC, Arlington, VA (US)

( * ) Notice: Subject to any disclaimer, the term of this patent is extended or adjusted under 35 U.S.C. 154(b) by 14 days.

(21) Appl. No.: 17/381,467

(22) Filed: Jul. 21, 2021

Related U.S. Application Data

(63) Continuation of application No. 16/194,033, filed on Nov. 16, 2018, now Pat. No. 11,087,048.

(51) Int. Cl.
*G06F 30/20* (2020.01)
(52) U.S. Cl.
CPC .................................. *G06F 30/20* (2020.01)
(58) Field of Classification Search
None
See application file for complete search history.

(56) References Cited

U.S. PATENT DOCUMENTS

| | | | | |
|---|---|---|---|---|
| 6,618,737 | B2* | 9/2003 | Aridor | G06F 9/465 |
| 6,658,358 | B2* | 12/2003 | Hao | G06F 30/00 |
| | | | | 702/41 |
| 7,486,292 | B2* | 2/2009 | Itoh | H04L 41/12 |
| | | | | 345/440 |
| 7,693,931 | B2* | 4/2010 | Polan | G06F 11/1482 |
| | | | | 709/201 |
| 9,043,742 | B1* | 5/2015 | McCracken | G06F 30/392 |
| | | | | 716/135 |
| 9,892,533 | B1* | 2/2018 | Tressler | G06T 11/206 |
| 10,565,749 | B1* | 2/2020 | Gove | G06T 1/20 |
| 2003/0208323 | A1* | 11/2003 | Hao | G06F 30/00 |
| | | | | 702/41 |

* cited by examiner

*Primary Examiner* — Steven M Christopher
(74) *Attorney, Agent, or Firm* — Armis IP Law, LLC

(57) ABSTRACT

One example method of operation may include creating a force approximation of a number of nodes in a defined space at an initial time (t0), the force approximation being based on a data realization simulation model of an n-body simulation, where n is an integer greater than one. The method may also include determining initial displacement changes of one or more of the nodes within the defined space has occurred in the force approximation, summing the initial displacement changes of the one or more of the nodes to create a summed total displacement, creating an initial displacement threshold (Td) based on the summed total displacement. At a later time (t1), determining additional displacement changes of one or more of the nodes have occurred, summing the additional displacement changes of the one or more of the nodes to create a new summed total displacement, comparing the new summed total displacement to the summed total displacement, and determining whether to create a new force approximation based on the comparison of the new summed total displacement to the summed total displacement.

22 Claims, 5 Drawing Sheets

200

250

DYNAMIC UPDATING OF A FORCE APPROXIMATION DATA MODEL

RELATED APPLICATIONS

This application is a continuation under 35 U.S.C. § 120 of earlier filed U.S. patent application Ser. No. 16/194,033 entitled "Dynamic Updating of a Force Approximation Data Model," filed on Nov. 16, 2018, the entire teachings of which are incorporated herein by this reference.

FIELD OF THE INVENTION

The present invention generally relates to dynamic force approximations, and more particularly, to techniques which provide optimized computing procedures for selectively and dynamically updating a force approximation based on monitored and identified changes to the data model.

BACKGROUND OF THE INVENTION

Conventional Spring-electric algorithms and corresponding data models belong to the family of force-directed graph layout algorithms. A graph G=(V, E) where a set of objects V, also called vertices or nodes, and a set of connections E, as called edges, and where each edge defines a connection between two vertices in V. Spring-electric algorithms cast the graph layout as an iterative physical simulation, where the algorithm models the graph's vertices similarly to charged particles that repel each other, and it also models the graph's edges similarly to springs that define an ideal distance between the vertices. The runtime of the repulsive force calculations can be arduous especially when repeated continuously over fixed time intervals and/or changes to the approximation.

One such data realization approximation model is the standard Barnes-Hut approximation, which works by building a quadtree of vertex positions, and then considers distant groups of vertices as a single large vertex. After each iteration of the spring-electric algorithm, the Barnes-Hut approximation calculates a new quadtree using the new vertex positions. This process of calculating the quadtree runs in $O(|V|*\log(|V|))$ time and reduces the force calculations to $O(|V|*\log(|V|))$ time. One proposed update scheme was a $|\_5*\log(i)\_|$ update scheme, where a new quadtree is calculated whenever $|\_5*\log(i)\_|$ changes, and 'i' is the current iteration number of the spring-electric algorithm. However, it may still not be necessary to calculate a new quadtree after every iteration and other considerations may be used to further optimize the update scheme and reduce unnecessary computer memory, processing, and disk space along with bandwidth over a network to achieve a similar result and still provide accurate approximation data and corresponding data model realizations.

One conventional optimization approach proposed updating an approximation on a fixed schedule with decreasing frequency, but that scheduled approach is not as optimal as a dynamic approach that dynamically adapts to the graph layout data itself as a basis for performing approximations.

SUMMARY

Example embodiments provide a method, device, system, non-transitory computer readable storage medium with a processor to perform operations, which may optimize an update scheme for a data model force approximation, and reduce unnecessary computer memory, processing, and disk space along with bandwidth over a network to achieve optimum results.

More specifically, the present application provides mechanisms and techniques that may include a method of operation that provides creating a force approximation of a number of nodes in a defined space at an initial time (t0), the force approximation being based on a data realization simulation model of an n-body simulation, where n is an integer greater than one. The method may also include determining initial displacement changes of one or more of the nodes within the defined space has occurred in the force approximation, summing the initial displacement changes of the one or more of the nodes to create a summed total displacement, creating an initial displacement threshold (Td) based on the summed total displacement. At a later time (t1), determining additional displacement changes of one or more of the nodes have occurred, summing the additional displacement changes of the one or more of the nodes to create a new summed total displacement, comparing the new summed total displacement to the summed total displacement, and determining whether to create a new force approximation based on the comparison of the new summed total displacement to the summed total displacement.

Another example embodiment includes an apparatus that includes a memory, and a processor configured to create a force approximation of a plurality of nodes in a defined space at an initial time (t0), the force approximation being based on a data realization simulation model of an n-body simulation, where n is an integer greater than one, determine initial displacement changes of one or more of the plurality of nodes within the defined space has occurred in the force approximation, sum the initial displacement changes of the one or more of the plurality of nodes to create a summed total displacement, create an initial displacement threshold (Td) based on the summed total displacement and store the initial displacement threshold (Td) in the memory, at a later time (t1), determine additional displacement changes of one or more of the plurality of nodes have occurred, sum the additional displacement changes of the one or more of the plurality of nodes to create a new summed total displacement, compare the new summed total displacement to the summed total displacement, and determine whether to create a new force approximation based on the comparison of the new summed total displacement to the summed total displacement.

Another example embodiment includes a non-transitory computer readable storage medium that stores instructions that when executed cause a processor to perform creating a force approximation of a number of nodes in a defined space at an initial time (t0), the force approximation being based on a data realization simulation model of an n-body simulation, where n is an integer greater than one. The processor may also be configured to perform determining initial displacement changes of one or more of the nodes within the defined space has occurred in the force approximation, summing the initial displacement changes of the one or more of the nodes to create a summed total displacement, creating an initial displacement threshold (Td) based on the summed total displacement. At a later time (t1), the processor may further being configured to perform determining additional displacement changes of one or more of the nodes have occurred, summing the additional displacement changes of the one or more of the nodes to create a new summed total displacement, comparing the new summed total displacement to the summed total displacement, and determining whether to create a new force approximation based on the comparison of the new summed total displacement to the summed total displacement.

Other embodiments include a computer system configured as a management station to perform all of the aforementioned methods via software control, or via hardware and/or software configured to perform those methods and the techniques disclosed herein as the invention.

Other embodiments of the invention that are disclosed herein include software programs to perform the operations summarized above and disclosed in detail below. More particularly, a computer program product is disclosed which has a computer-readable medium including computer program logic encoded thereon to provide the methods for dynamic force approximations according to this invention and its associated operations. The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the dynamic force approximation of this invention typically performs (e.g., executes, runs, or is otherwise operated) on a server or computing device coupled to a data storage or other type of network. The server performing the approximations is generally networked but is typically a dedicated computer system, personal computer or workstation operated by a network or systems administrator or manager. In alternative arrangements however, the processing node of this invention may reside on a computer system located elsewhere on the network and the user (e.g., systems manager) that provides such services may be located elsewhere on the network and may be communicating with the server over a network connection (e.g., WWW or other browser-type interface, command-line interface, messaging interface, E-Mail, or another protocol or interface). The server may operate as a virtual machine in a cloud computing network.

An example implementation of the invention that incorporates certain of the aforementioned embodiments is the Dynamic Barnes-Hut software application manufactured by Two Six Labs, LLC of Arlington, Va.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The present invention provides techniques and mechanisms to create graph layouts, data realization models, etc., in an optimal manner. In conventional approaches, the process of computing large-scale data models with many data references, nodes, edges, etc., can be a slow computing process, especially when multiple iterations are necessary to update the model every time the modeled data varies/changes. In general, a graph is a mathematical structure defining a set of nodes, also referred to as vertices, and the links, or edges, may be used to connect those nodes. Common graph layout algorithms may implement an iterative spring-electric algorithm. This type of algorithm treats the graph layout as a physics simulation where vertices in the graph are modeled as charged particles that repel each other, and edges in the graph are modeled as springs that define the ideal distance between two vertices to create a static data realization at any given point in time. Spring-electric algorithms typically use a Barnes-Hut approximation to 'speed-up' the 'charged particle' calculations, but this process may still be slow when the graph contains many vertices. Fast algorithms to create graph layouts are becoming increasingly popular since data analysts often use these faster layouts to visualize and understand graph datasets, such as, for example, social networks, gene regulatory networks, telecommunications networks, and software dependency structures.

In one example embodiment, a server or other computing node(s) may have its computation time and resources reduced to produce data model layouts and visualizations of graph datasets. Example tests indicate that the computation time may be reduced up to 51%. Many different approximation models may be used in accordance with example embodiments. However, for purposes of this example and related examples, the Barnes-Hut approximation will be referenced and discussed as an example approximation model. Those skilled in the art will recognize that other types of data approximation models may also be substituted in place of the Barnes-Hut approximation to apply the inventive procedures of the example embodiments. In a standard conventional Barnes-Hut approximation, the computing devices may compute a new approximation at every iteration of a spring-electric layout algorithm. In contrast, example embodiments disclose a dynamic approximation approach that dynamically checks whether the current approximation is outdated, and if so, it calculates a new approximation, otherwise, it reuses the old approximation and avoids unnecessary approximation calculation iterations.

Figure 1:
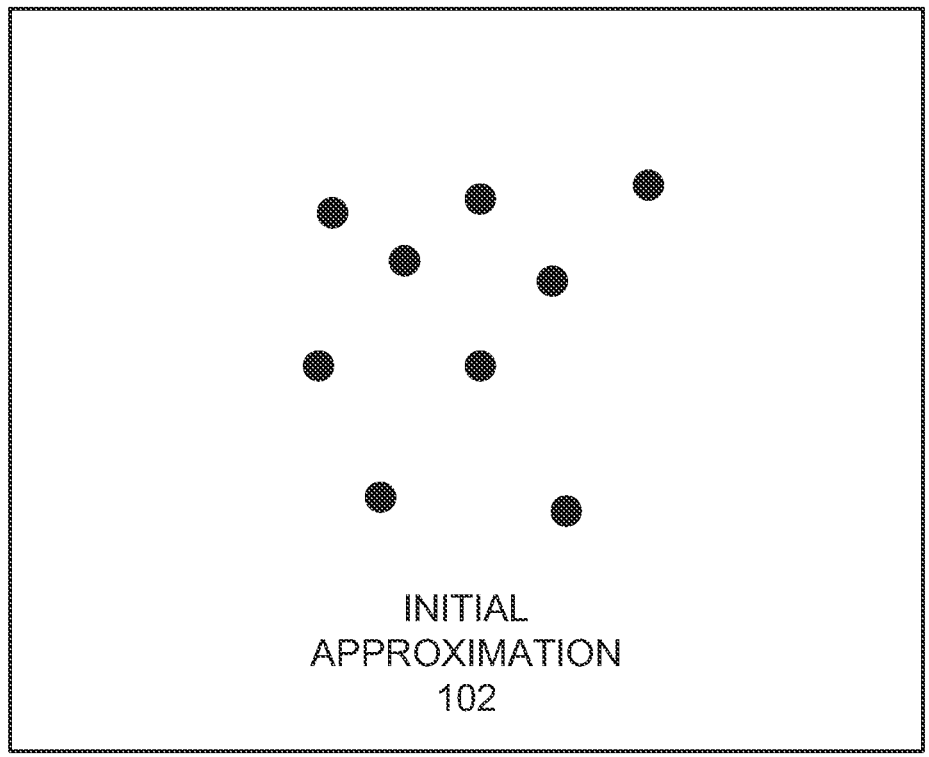
FIG. 1 illustrates an example of a data realization model of a force approximation and subsequent approximation being performed based on a dynamic threshold, according to example embodiments of the present application.
Figure 1:
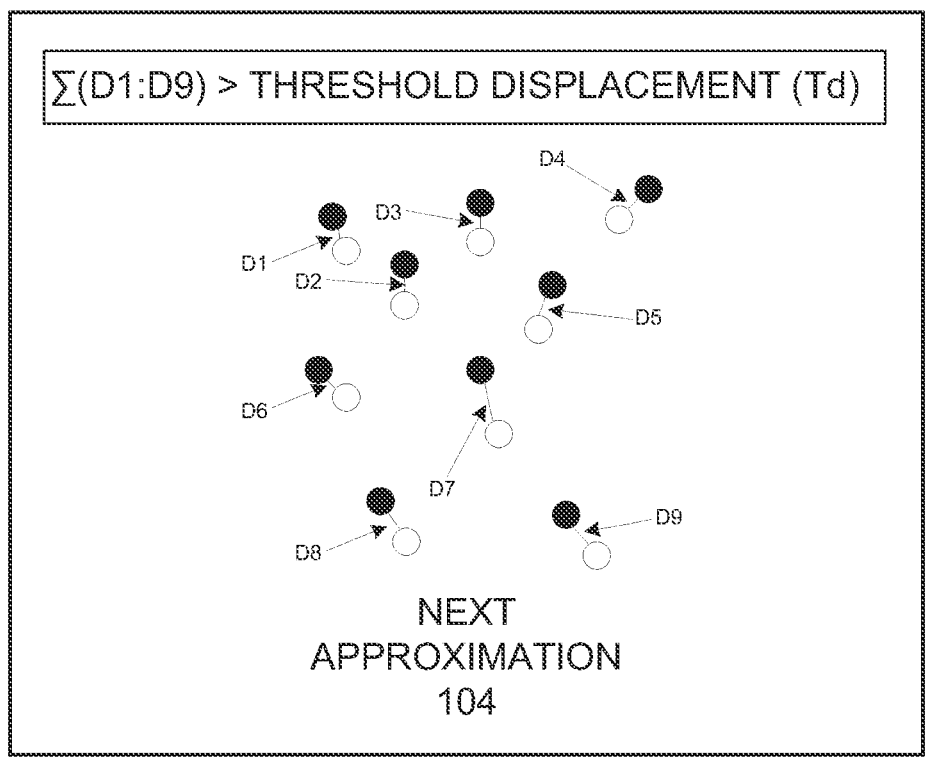

FIG. 1 illustrates an example of a data realization model of a force approximation and subsequent approximation being performed based on a dynamic threshold, according to example embodiments of the present application. Referring to FIG. 1, two approximations 100 include a first or initial approximation as a rendered diagram of data including various nodes in a spring-electric type of data tree. Once all the nodes are identified via the initial approximation 102, those nodes may be monitored via a monitoring function that periodically reports changes to the node positions. For example, by measuring the velocity or displacement of all the vertices/nodes at every iteration of time and/or an event cycle, then when the total amount of displacement, for all nodes, changes sufficiently beyond an expected or baseline/threshold amount, then a new approximation 104 may be calculated based on the current node positions, assuming the total displacement exceeded the threshold level. The baseline/threshold may be dynamically adjusted for each approximation that is rendered.

In the example of FIG. 1, the next iteration or cycle may include a period of time, a detection of displacement from one or more of the current nodes, and/or other events which cause the iteration cycle to repeat, monitor and measure the previously known locations of the nodes within the approximation and the current positions of the nodes at the current time. As displacement is identified (D1-D9) for one or more of the nodes being monitored, the total displacement of all nodes may be calculated as a sum ($\Sigma(D1:D9)$) at a first iteration (Ii) where D1:D9 denotes all values of displacement from D1 to D9. The total of the summation may be used as a basis for assignment to a dynamic threshold that is subject to change when the next set of displacement values meet or exceed the values of the current threshold (Td).

The dynamic approximation limiting procedure/algorithm may decrease the computation time of iterative spring-electric graph layout algorithms by 6% to 51% according to experimentation. In addition to the Barnes-Hut approximation, other approximations which may be adapted to the specific approximation update approach of this disclosure, and may include a fast multipole method approximation and a well-separated pair decomposition approximation, however, those example approximations are not an exhaustive list of approximation models which could use the dynamic approximation procedure of the present application. Also, certain applications of this data modeling procedure may include but are not limited to particle physics simulations, astronomical simulations, social network simulations, telecommunication network simulations, and/or software dependency simulations.

In a standard conventional approximation algorithm, at the beginning of each iteration, the algorithm (i.e., Barnes-Hut) may be used to compute a new quadtree and then compute the forces on each vertex/node. In contrast, as shown in the following algorithm according to example embodiments, the dynamic Barnes-Hut algorithm performs a check to decide whether to calculate a new quadtree or use the old quadtree to calculate current force values. This check-up operation maintains a continual sum of the velocities/displacements of all vertices/nodes since the last time the quadtree was updated via an approximation computation cycle. If this sum exceeds the previous sum, the new sum is assigned to the previous sum, and the running sum is reset to zero, and a new quadtree is calculated before computing the current force values, otherwise, the algorithm will use the current quadtree an accurate enough approach, and uses it to compute forces on the nodes.

The algorithm provides: an initial value of currSum=prevSum=0. Then, for each node (u), set the currSum=currSum+$|u_{v,x}|$+$|u_{v,y}|$ (end for loop). Then, if the quadtree is null or currSum>=prevSum then prevSum is the currSum, and set currSum back to zero and the quadtree will be the new quadtree (end if statement), and compute the new force values. The values $|u_{v,x}|$ and $|u_{v,y}|$ represent the x and y components of displacements of a particular node (u). The value currSum is a current summation and the value prevSum is a previous summation.

The dynamic threshold triggered algorithm does not reduce the overall running time from a $O(|V|*\log(|V|))$ calculation, but it can reduce the number of times a quadtree is calculated, thereby reducing the number of $O(|V|*\log(|V|))$ calculations required and reducing the overall computation time.

Figure 2A:
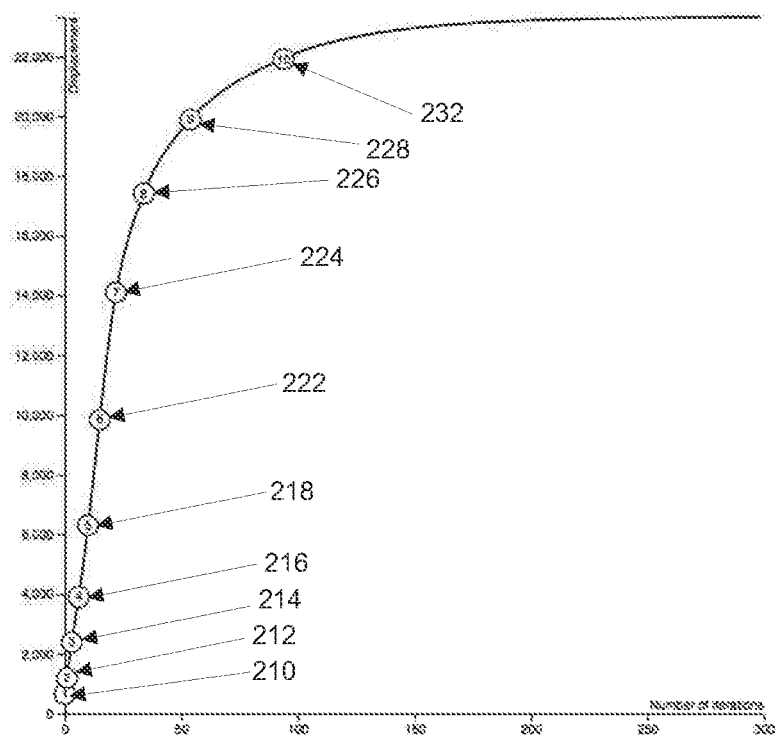
FIG. 2A illustrates an example line graph demonstrating the amount of summed displacement over a number of iterations of recalculated approximations, according to example embodiments of the present application.

FIG. 2A illustrates an example line graph demonstrating the amount of summed displacement over a number of iterations of recalculated approximations, according to example embodiments of the invention. Iterations and approximations are not the same. Referring to FIG. 2A, the graph illustration 200 include an x-axis of iterations identified over time, and the y-axis illustrates displacement measurements of distance units. In one example, the approximations conducted or calculated over a particular cycle of iterations may be 10 cycles, as indicated by the numbers 1-10 which are identified by reference numerals 210-232. Of those 10 approximations, nearly 100 iterations of changes were identified, as indicated by the x-axis portion of the line graph. In this example, over about 100 iterations of the force model, only 10 approximations have occurred. This demonstrates a significant reduction in the number of approximations being rendered as compared to the number of iterations. As time continues to pass, the amount of change begins to slow down and the reference numerals 210-232 indicate where a threshold was exceeded and an approximation occurred. From the graph line, the distances/displacements between the approximations slowly continues to rise for the first seven approximation calculations and then tapers off.

Figure 2B:
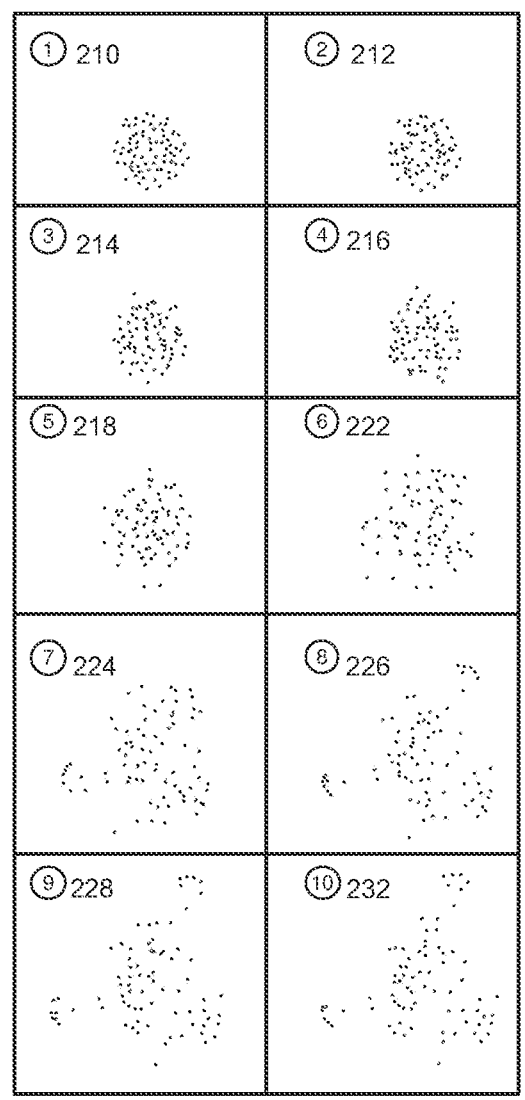
FIG. 2B illustrates data realization models of the nodes and their relative positions corresponding to the various approximation cycles identified in the line graph of FIG. 2A, according to example embodiments of the present application.

FIG. 2B illustrates data realization models of the nodes and their relative positions corresponding to the various approximation cycles identified in the line graph of FIG. 2A, according to example embodiments. Referring to FIG. 2B, the example approximations 250 include a corresponding force model for a fixed set of nodes being monitored over the 10 cycles identified in FIG. 2A. The nodes are continuously spreading out and the approximations are performed for different perspectives based on thresholds. As a result, a notable difference is present for each approximation, as opposed to performing many approximations corresponding to each iteration, which wastes computing resources without demonstrating any significant changes for several approximations over a period of time.

Figure 3:
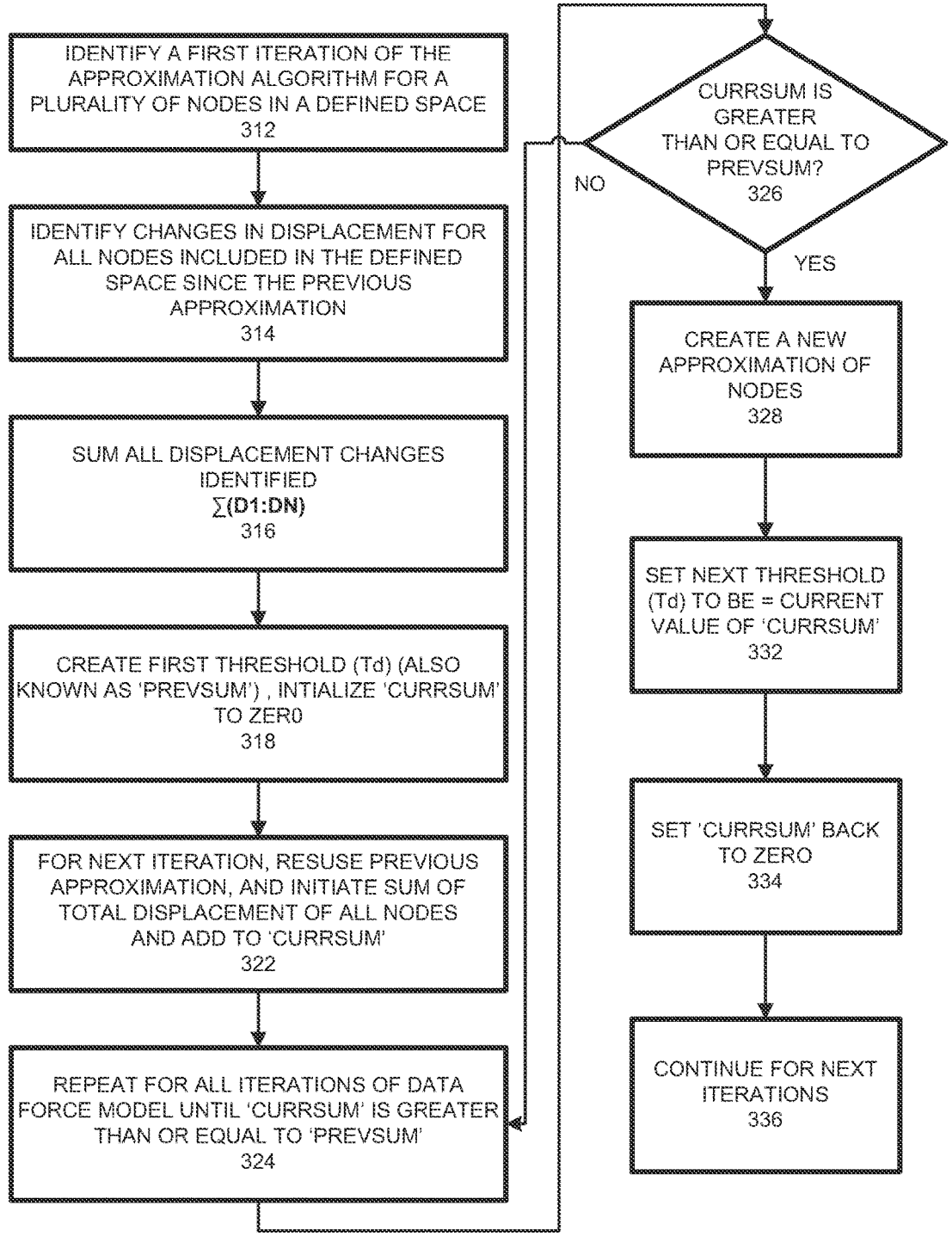
FIG. 3 illustrates an example logic diagram of the operations included in the dynamic approximation model according to example embodiments of the present application.

FIG. 3 illustrates an example logic diagram of the operations included in the dynamic approximation model according to example embodiments. Referring to FIG. 3, in the example flow diagram 300, in order to use a dynamic threshold algorithm to determine a trigger point as to when to perform additional approximations, during a first iteration of the algorithm, no approximation exists yet, so the algorithm creates an approximation and uses it to calculate changes in position for all of the objects/nodes 312. Next, all the changes are identified 314 and the total amount of change in position (i.e., displacement) is summed 316 for all the nodes based on their previous positions and their current positions in the defined space. The total displacement identified is set as the first threshold (Td), which is also referred to as a previous sum 'prevSum' 318. The value for 'currsum' is set to zero. For the next iteration at a later time, the old approximation is reused, and the total displacement of all the nodes is added-up in the current iteration and then added to 'currSum' 322. Such a process is repeated 324 until the value of 'currSum' is greater or equal to 'prevSum' 326, then a new approximation is created based on the current object positions 328, or, the next iteration is performed. Then, the next threshold (Td) is set to be the current value of 'currSu'' 332. The value 'prevSum' is used to create the new threshold and is set to be equal to the current value of 'currSum', and the variable 'currSum' is again initialized back to zero '0' 334. Then, the iterative process continues 336 by reusing the old approximation, and summing the total displacement of all the objects in this iteration and adding them to the 'currSum' value until the value of 'currSum' is once again greater or equal to 'prevSum'.

In an experiment on 100 graph datasets randomly selected from the KONECT and SUITESPARSE graph collections, a dynamic threshold and selective approximation procedure using the Barnes-Hut approximation ('dynamic Barnes-Hut') model performed faster than a standard Barnes-Hut on all graphs with a 51% decrease in runtime, a median case of an 18% decrease, and a worst case of a 6% decrease. This approach also performed faster than a $\lfloor\_5*\log(i)\_\rfloor$ approximation on all but two graphs with a 36% decrease in runtime, a median case of an 8% decrease, and a worst case of a 5% increase. The $\lfloor\_5*\log(i)\_\rfloor$ approximation performed faster than a standard Barnes-Hut in all but one graph with a 23% decrease in runtime, a median case of a 10% decrease, and a worst case of a 1% increase.

Because the spring-electric layout algorithm in this example was processed for 300 iterations, the $\lfloor\_5*\log(i)\_\rfloor$ algorithm calculates a new quadtree 26 times during the layout. The maximum median number of times a dynamic Barnes-Hut calculates a new quadtree is 20, with a median of 12 and a minimum of 7. This reduction in calculating new quadtrees demonstrates why the dynamic Barnes-Hut approach of the example embodiments is faster and more efficient than a $\lfloor\_5*\log(i)\_\rfloor$ approximation and why the $\lfloor\_5*\log(i)\_\rfloor$ approximation is faster than a standard Barnes-Hut approximation. However, the dynamic Barnes-Hut approximation requires a linear-time summation of each nodes displacement at each iteration, whereas the $\lfloor\_5*\log(i)\_\rfloor$ approximation algorithm does not require such information.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

Figure 4:
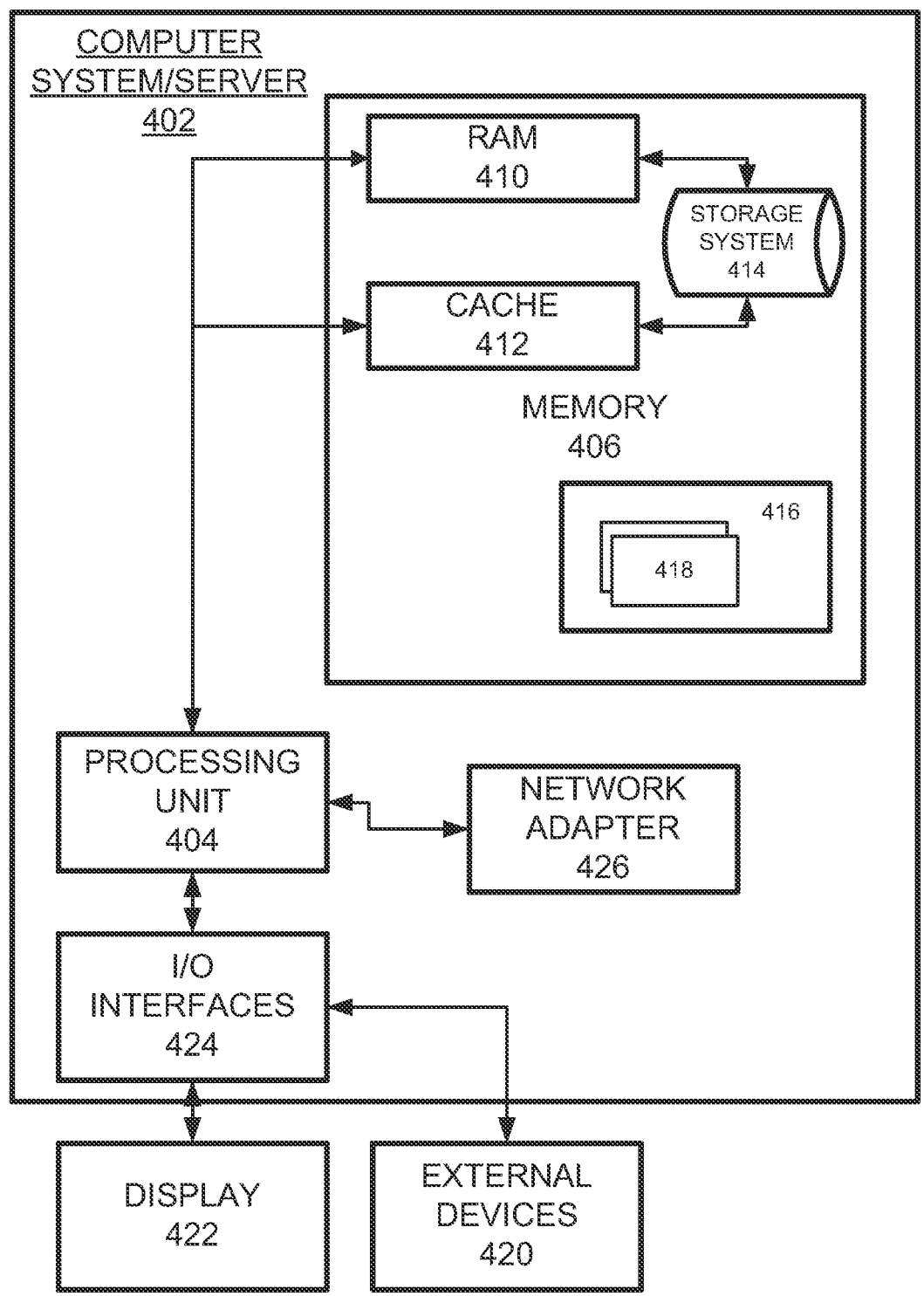
FIG. 4 illustrates a computer processing entity which is intended to promote the computational procedures and related operations of the example embodiments of the present application.

FIG. 4 is not intended to suggest any limitation as to the scope of use or functionality of embodiments of the application described herein. Regardless, the computing node 400 is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus that couples various system components including system memory 406 to processor 404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random-access memory (RAM) 410 and/or cache memory 812. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 406 may include at least one program product having a set (e.g., at least one) of program modules that are configured to carry out the functions of various embodiments of the application.

Program/utility 416, having a set (at least one) of program modules 418, may be stored in memory 406, by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices.

Such communication can occur via I/O interfaces 424. Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A method comprising:
creating a force approximation of a plurality of nodes in a defined space at an initial time (t0), the force approximation being based on a data realization simulation model of an n-body simulation;
determining that initial displacement changes of one or more of the plurality of nodes within the defined space has occurred in the force approximation;
summing the initial displacement changes of the one or more of the plurality of nodes to create a summed total displacement; and
based on a summation of additional displacement changes of one or more of the plurality of nodes, determining whether to create a new force approximation.

2. The method of claim 1 further comprising:
creating an initial displacement threshold (Td) based on the summed total displacement;
determining that the additional displacement changes of one or more of the plurality of nodes have occurred at a later time (t1); and
summing the additional displacement changes of the one or more of the plurality of nodes to create a new summed total displacement.

3. The method of claim 1 wherein the processor is further configured to:
comparing the summation of additional displacement changes to the summed total displacement; and
creating the new force approximation based on the comparison of the summation of additional displacement to the summed total displacement.

4. The method of claim 3, wherein comparing the summation of additional displacement changes defines a new summed total displacement, further comprising comparing the new summed total displacement to the summed total displacement by comparing the initial displacement threshold to the new summed total displacement to determine whether the new summed total displacement is greater than or equal to an initial displacement threshold.

5. The method of claim 4, wherein when the new summed total displacement is greater than or equal to the initial displacement threshold, creating the new force approximation of the plurality of nodes.

6. The method of claim 4, wherein when the new summed total displacement is greater than or equal to the initial displacement threshold, setting the initial displacement threshold to a new displacement threshold that is equal to the new summed total displacement and setting a current summed total value of displacement to zero.

7. The method of claim 6, wherein the current summed total value of displacement is iteratively summed over continuing time intervals to include all subsequent summed total displacement values until the current summed total value of displacement is greater than or equal to the new displacement threshold value.

8. The method of claim 7, wherein when the current summed total value of displacement, over a certain number of the continuing time intervals, is greater than or equal to the new displacement threshold value, then setting the new displacement threshold value to the current summed total.

9. The method of claim 2, wherein when a displacement of the plurality of nodes is greater than or equal to the initial displacement threshold (Td), creating the new force approximation based on current positions of the plurality of nodes.

10. The method of claim 1, wherein the force approximation comprises a Barnes-Hut approximation.

11. An apparatus comprising: a memory; and a processor configured to: create a force approximation of a plurality of nodes in a defined space at an initial time (t0), the force approximation being based on a data realization simulation model of an n-body simulation; determine that initial displacement changes of one or more of the plurality of nodes within the defined space has occurred in the force approximation; sum the initial displacement changes of the one or more of the plurality of nodes to create a summed total displacement; and based on a summation of additional displacement changes of one or more of the plurality of nodes, determine whether to create a new force approximation.

12. The apparatus of claim 9, wherein the processor is further configured to: create an initial displacement threshold (Td) based on the summed total displacement and store the initial displacement threshold (Td) in the memory; at a later time (tI), determine additional displacement changes of one or more of the plurality of nodes have occurred; and sum the additional displacement changes of the one or more of the plurality of nodes to create a new summed total displacement.

13. The apparatus of claim 9 wherein the processor is further configured to: compare the summation of additional displacement changes to the summed total displacement; and create the new force approximation based on the comparison of the summation of additional displacement to the summed total displacement, compare the new summed total displacement to the summed total displacement; and determine whether to create a new force approximation based on the comparison of the new summed total displacement to the summed total displacement.

14. The apparatus of claim 11, wherein the summation of additional displacement changes defines a new summed total displacement, and the processor compares the new summed total displacement to the summed total displacement by a further operation to compare the initial displacement threshold to the new summed total displacement to determine whether the new summed total displacement is greater than or equal to the initial displacement threshold.

15. The apparatus of claim 12, wherein the processor is further configured to, when the new summed total displacement is greater than or equal to an initial displacement threshold, create the new force approximation of the plurality of nodes.

16. The apparatus of claim 12, wherein when the new summed total displacement is greater than or equal to the initial displacement threshold, the processor is configured to set the initial displacement threshold to a new displacement threshold that is equal to the new summed total displacement and set a current summed total value of displacement to zero.

17. The apparatus of claim 14, wherein the current summed total value of displacement is iteratively summed over continuing time intervals to include all subsequent summed total displacement values until the current summed total value of displacement is greater than or equal to the new displacement threshold value.

18. The apparatus of claim 15, wherein when the current summed total value of displacement, over a certain number of the continuing time intervals, is greater than or equal to the new displacement threshold value, then the processor is configured to set the new displacement threshold value to the current summed total.

19. The apparatus of claim 10, wherein when a displacement of the plurality of nodes is greater than or equal to the initial displacement threshold (Td), the processor creates the new force approximation based on current positions of the plurality of nodes.

20. The apparatus of claim 9, wherein the force approximation comprises a Barnes-Hut approximation.

21. The apparatus of claim 9, further comprising: a user interface device, configured to display an indication of the created new force approximation.

22. A non-transitory computer readable storage medium configured to store instructions that when executed cause a processor to perform a method comprising: creating a force approximation of a plurality of nodes in a defined space at an initial time (t0), the force approximation being based on a data realization simulation model of an n-body simulation; determining that initial displacement changes of one or more of the plurality of nodes within the defined space has occurred in the force approximation; summing the initial displacement changes of the one or more of the plurality of nodes to create a summed total displacement; and based on a summation of additional displacement changes of one or more of the plurality of nodes, determining whether to create a new force approximation.

\* \* \* \* \*